M. Mickelson,

Wheel Plow.

No. 93,464.    Patented Aug. 10, 1869.

UNITED STATES PATENT OFFICE.

M. MICKELSON, OF ASHLAND MILLS, OREGON.

IMPROVEMENT IN TRUCK-PLOWS.

Specification forming part of Letters Patent No. 93,464, dated August 10, 1869.

*To all whom it may concern:*

Be it known that I, M. MICKELSON, of Ashland Mills, in the county of Jackson and State of Oregon, have invented a new and useful Improvement in Truck-Plows; and I do hereby declare that the following is a full, clear, and exact description thereof, which will enable others skilled in the art to make and use the same, reference being had to the accompanying drawing, forming part of this specification.

The object of this invention is to provide improvements in plow-trucks calculated to facilitate the management of the plows connected to them, in guiding and adjusting them so as to take more or less land, the tongue being rigidly connected to the beam when properly adjusted; also, in adjusting the plows relatively to the depth of cutting, and for raising them out of the ground; also, for adjusting the wheels of the truck so as to support the axle and the body of the truck in a horizontal plane, either when both the wheels run on the surface in making the first furrow, or after the first furrow has been made and one wheel runs in the furrow, all as hereinafter more fully specified.

Figure 1:
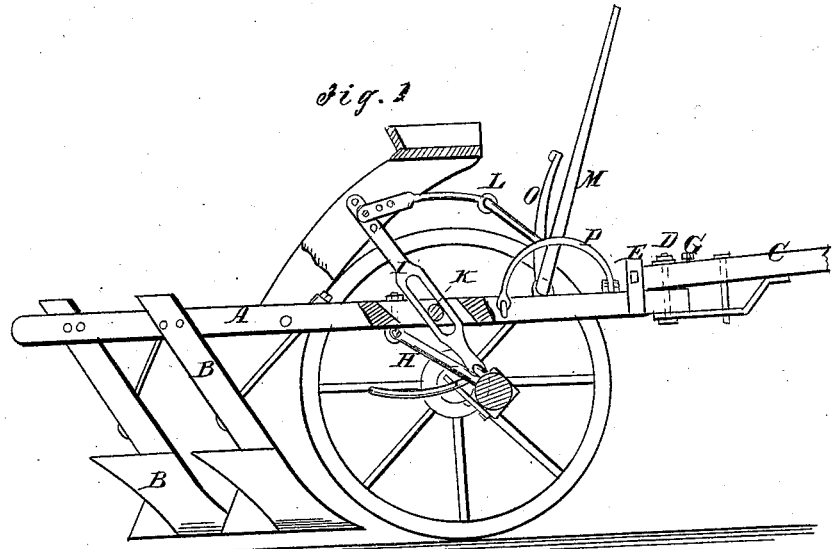
Figure 2:
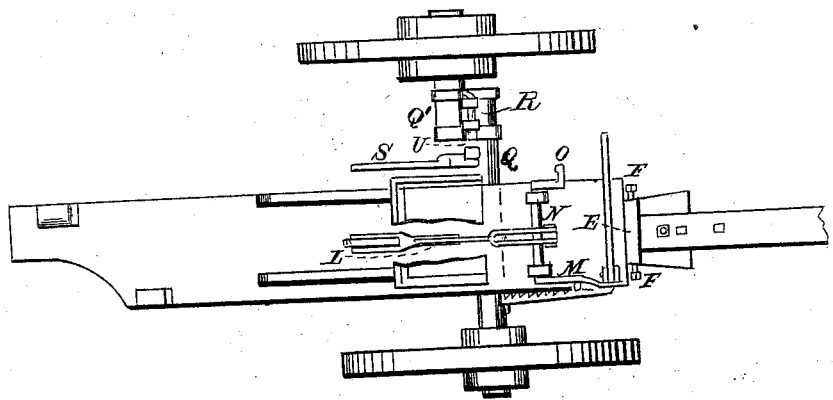

Figure 1 represents a longitudinal sectional elevation of my improved plow-truck, and Fig. 2 represents a plan view of the same.

Similar letters of reference indicate corresponding parts.

A represents the body of the truck, supporting one or more plows, B, in the rear. C represents the tongue, which is pivoted to the front end by a vertical bolt, D, and projects rearward into a yoke, E, having set-screws F tapped through the sides, for screwing up against the end of the tongue to hold it at any required pitch, for governing the lateral draft of the plow, for cutting wide or narrow furrows.

The tongue is held rigidly in the required position by the said set-screws, when adjusted as required.

G represents a set-screw for adjusting the height of the front end of the tongue.

The frame A is hinged to the axle by the bent rod H in such a manner that by the turning of the axle to bring the radial arms of the said bent rod toward the vertical or horizontal plane, the said frame will be lowered or depressed, as required; and for effecting this change a lever, I, is jointed to the axle, and rises up through a slot in the bed, wherein a transverse fulcrum-bolt, K, is placed, which passes through a slot in the said lever. The upper end of this lever is connected, by suitable rods or links L, to the lever M of a rock-shaft, N, also provided with a foot-lever, O.

P represents a curved notched bar for holding the lever at any required point. By pressing these levers M and O forward the frame of the truck will be thrust forward on the axle, so as to bring the arms of the bent rod toward the vertical line, and thereby the plows will be elevated, and by moving them in the other direction the plows will be lowered.

The axle is made in two parts, Q and Q', and hinged together at R, so that one part may be rolled to some extent around the other by moving the lever S, which is rigidly connected to, or is a part of, the pintle U of the hinge-joint, and which is permanently connected to the part Q' of the axle, so as to cause it to roll on the part Q.

When the two wheels are required to move on the surface of the ground, as in making the first furrow, the hand crank or lever S is turned down and secured by a hook, so as to maintain both parts of the axle in the same horizontal plane, or nearly so, which will maintain the truck in a horizontal plane.

When operating with one wheel in a furrow, the lever S is disengaged from the hook, and the part Q of the axle allowed to swing under the other, which it will do in consequence of supporting the weight of the truck.

Having thus described my invention, what I claim as new, and desire to secure by Letters Patent, is—

1. The arrangement, together with the tongue and the frame, of the pivot-bolt D, yoke E, and set-screws F, all substantially as specified.

2. The combination, with the frame and axle, of the bent rod H, lever I, and levers M O, when arranged substantially as specified.

3. The axle constructed in two parts, hinged together and otherwise arranged as specified, for governing the plane of the truck, as described.

M. MICKELSON.

Witnesses:
 EBER EMERY,
 JACOB WAGNER.